United States Patent
Vaughns, Sr. et al.

(10) Patent No.: US 7,513,532 B1
(45) Date of Patent: Apr. 7, 2009

(54) DEVICE TO ADJUST TENSION IN A SHOULDER BELT

(76) Inventors: Thomas E. Vaughns, Sr., 328 Pompano Cir., Foster City, CA (US) 94404-1904; Bessie M. Vaughns, 328 Pompano Cir., Foster City, CA (US) 94404-1904

( * ) Notice: Subject to any disclaimer, the term of this patent is extended or adjusted under 35 U.S.C. 154(b) by 322 days.

(21) Appl. No.: 11/609,618

(22) Filed: Dec. 12, 2006

(51) Int. Cl.
*B60R 21/01* (2006.01)
*B60R 22/03* (2006.01)
*A62B 35/00* (2006.01)

(52) U.S. Cl. .......................... 280/808; 297/483; 297/486
(58) Field of Classification Search ................. 280/808, 280/801.1, 801.2, 802, 803, 807; 297/483, 297/468, 469, 474, 482, 486
See application file for complete search history.

(56) References Cited

U.S. PATENT DOCUMENTS

| | | | | |
|---|---|---|---|---|
| 2,878,981 A * | 3/1959 | Guido | ......................... | 441/80 |
| 3,472,552 A * | 10/1969 | Stoffel et al. | ................. | 297/474 |
| 3,542,425 A * | 11/1970 | Pringle | ....................... | 297/474 |
| 4,067,612 A | 1/1978 | Weman | | |
| 4,319,769 A * | 3/1982 | Compeau et al. | ............. | 280/808 |
| 4,648,625 A * | 3/1987 | Lynch | ........................ | 280/808 |
| 4,826,250 A | 5/1989 | Ibanez | | |
| 4,832,366 A * | 5/1989 | Corbett et al. | ............... | 280/808 |
| 4,938,535 A * | 7/1990 | Condon et al. | ............... | 297/483 |
| 4,958,416 A | 9/1990 | Frishling | | |
| 5,058,922 A * | 10/1991 | Long | ........................... | 280/808 |
| 5,086,989 A * | 2/1992 | Kapanka | ..................... | 242/372 |
| 5,135,257 A * | 8/1992 | Short | ......................... | 280/808 |
| 5,149,135 A * | 9/1992 | Konishi et al. | .............. | 280/806 |
| 5,211,423 A * | 5/1993 | Krambeck | ................... | 280/806 |
| 5,215,333 A * | 6/1993 | Knight | ..................... | 280/801.1 |
| 5,411,221 A * | 5/1995 | Collins et al. | ................ | 242/372 |
| D378,468 S | 3/1997 | Rydgren | | |
| 5,628,529 A * | 5/1997 | Golz et al. | ............... | 280/801.2 |
| 5,692,806 A | 12/1997 | Jones | | |
| 7,314,235 B2 * | 1/2008 | Downey | ...................... | 280/808 |

* cited by examiner

*Primary Examiner*—John Q. Nguyen
*Assistant Examiner*—Karen Amores

(57) ABSTRACT

This patent discloses a device to adjust tension in a shoulder belt of a vehicle. The device may include a front cover and a back cover placed within the front cover to form a cover opening. A spring may be secured to an interior of the back cover by the spring anchor, where the spring may be a coiled internal power spring. The device may have a band having a first band end and a second band end, where the first band end may contain hook fasteners and the second band end may contain loop fasteners such that, when brought together, the hook fasteners and loop fasteners may be secured to each other to form a band loop. The device may have a cord connected between to the first band end and the spring and configured to extend through the cover opening.

16 Claims, 4 Drawing Sheets

DEVICE TO ADJUST TENSION IN A SHOULDER BELT

BACKGROUND

1. Field

The information disclosed in this patent relates to a device to adjust tension that a safety shoulder belt may apply against an upper portion of a restrained persons' body.

2. Background Information

A seat belt, sometimes called a safety belt, may be viewed as a harness configured to hold in place the occupant of a car or other vehicle if a collision occurs or, more commonly, if the vehicle stops suddenly. Seat belts are intended to reduce injuries by stopping the wearer from hitting hard interior elements of the vehicle or from being thrown from the vehicle. In cars, seat belts also prevent rear-seat passengers from crashing into those in the front seats.

Many driver side and passenger side seat belts have a single webbing that forms both a lap belt portion and a shoulder belt portion. Typically, the shoulder belt retracts from tension and presses against the chest and shoulder of the driver. This causes discomfort and chafing to the shoulder belt wearer. In addition, pressure from the shoulder belt causes unsightly wrinkling and creasing of clothes. Statistics have shown that fifty-one percent of drivers who dread the uncomfortable pressure of a seat belt will very often not wear one.

What is needed is a device to adjust tension in a shoulder belt.

SUMMARY

This patent discloses a device to adjust tension in a shoulder belt of a vehicle. The device may include a front cover and a back cover placed within the front cover to form a cover opening. A spring may be secured to an interior of the back cover by the spring anchor, where the spring may be a coiled internal power spring. The device may have a band having a first band end and a second band end, where the first band end may contain hook fasteners and the second band end may contain loop fasteners such that, when brought together, the hook fasteners and loop fasteners may be secured to each other to form a band loop. The device may have a cord connected between to the first band end and the spring and configured to extend through the cover opening.

DETAILED DESCRIPTION

Figure 1:
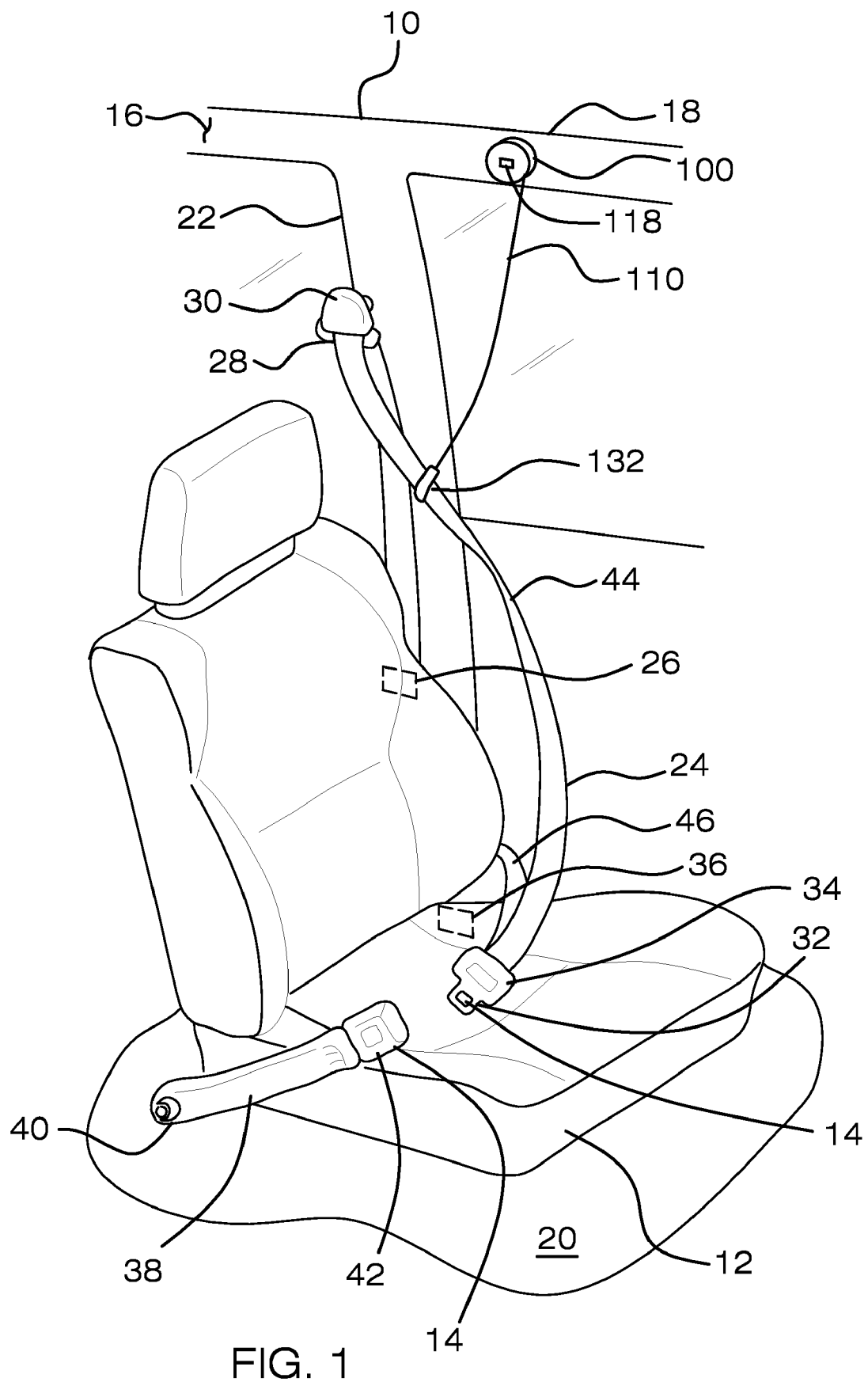
FIG. 1 is an isometric view of a vehicle 10 and a tension relief device 100.

FIG. 1 is an isometric view of a vehicle 10 and a tension relief device 100. Vehicle 10 may include a seat 12 and a safety belt 14, each supported by a vehicle frame 16. Vehicle 10 may be any conveyance that transports people or objects, such as an automobile, boat, and airplane. Seat 12 may be any support where a person may sit. Safety belt 14 may be a harness that may be configured to hold in place the occupant of a car or other vehicle Vehicle 10 further may include a horizontal frame 18, a floor 20, and a vertical frame 22 residing between horizontal frame 18 and floor 20. Safety belt 14 may include a webbing 24, a belt webbing retractor/anchor 26, a webbing guide 28 having a bolt (hidden) covered by a shoulder bolt cap 30, a latch plate 32 connected to a latch plate guide 34, a webbing anchor 36, and a buckle arm 38 connected between a buckle anchor 40 and a buckle 42.

Webbing 24 may be a sturdy fabric woven in narrow widths for use where strength is required. Belt webbing retractor/anchor 26 may secure a first end of webbing 24 to vehicle 10 as well as include a winding mechanism to retract and release webbing 24.

Webbing guide 28 may be fixed to vertical frame 22 at a point near horizontal frame 18 and provide a pivot point for webbing 24. Webbing 24 may be threaded through webbing guide 28 and latch plate guide 34 to form a shoulder belt 44. Latch plate guide 34 may provide a pivot point for webbing 24. Webbing 24 further may be threaded through latch plate guide 34 to webbing anchor 36 to form a lap belt 46. Webbing anchor 36 may secure a second end of webbing 24 to vehicle 10.

Buckle anchor 40 may secure buckle arm 38 and buckle 42 to vehicle 10. Buckle arm 38 may extend buckle 42 towards latch plate 32. When latch plate 32 is inserted into and secured by buckle 42, lap belt 46 may be secured across a person's thighs below an abdomen. Shoulder belt 44 may be secured against a shoulder of the person and across a chest of that person. A winding mechanism of belt webbing retractor/anchor 26 may place shoulder belt 44 under a predetermined tension that may cause shoulder belt 44 to press against a shoulder and chest of a person utilizing safety belt 14.

Figure 2:
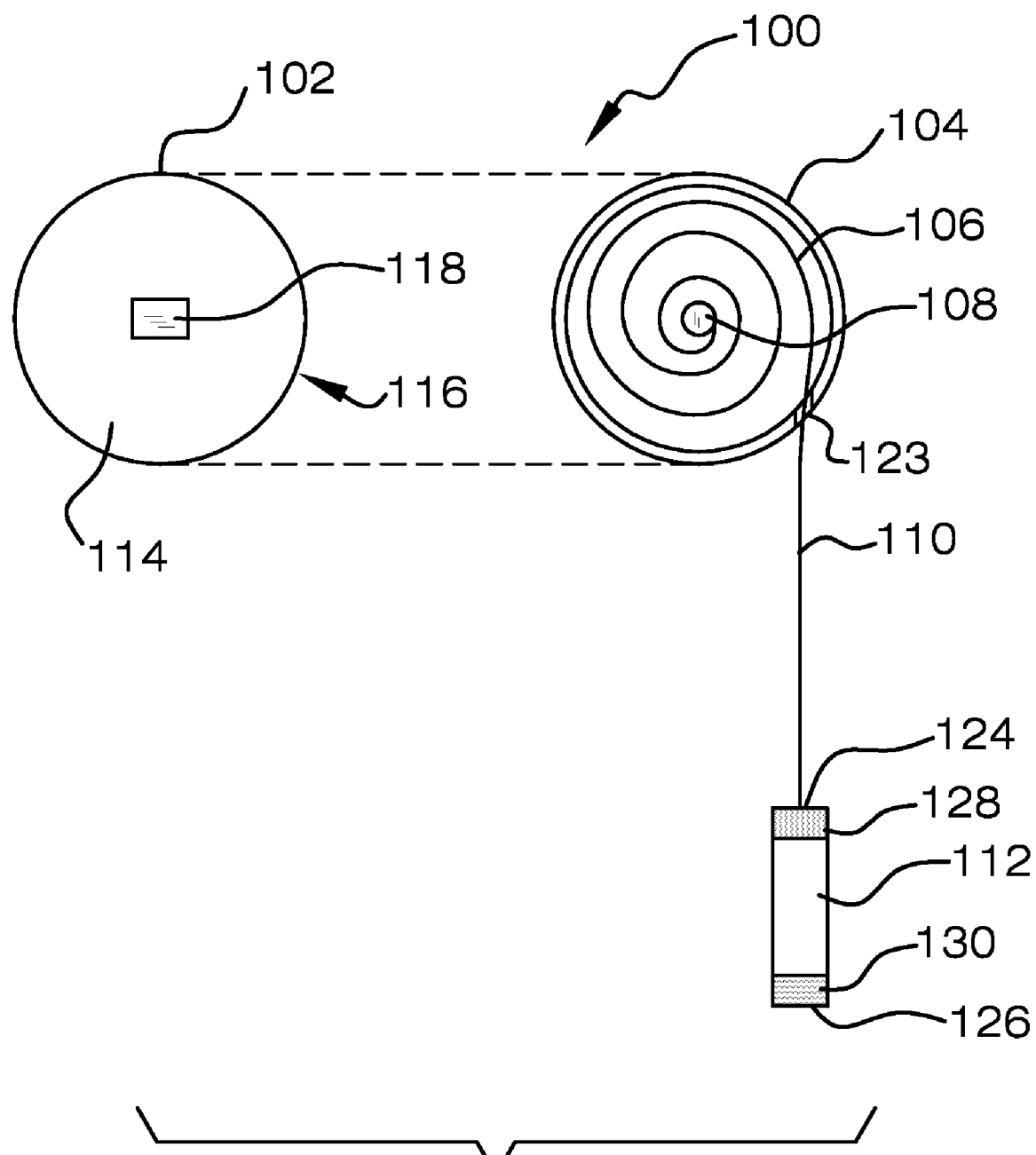
FIG. 2 is an exploded front view of tension relief device 100.
Figure 3:
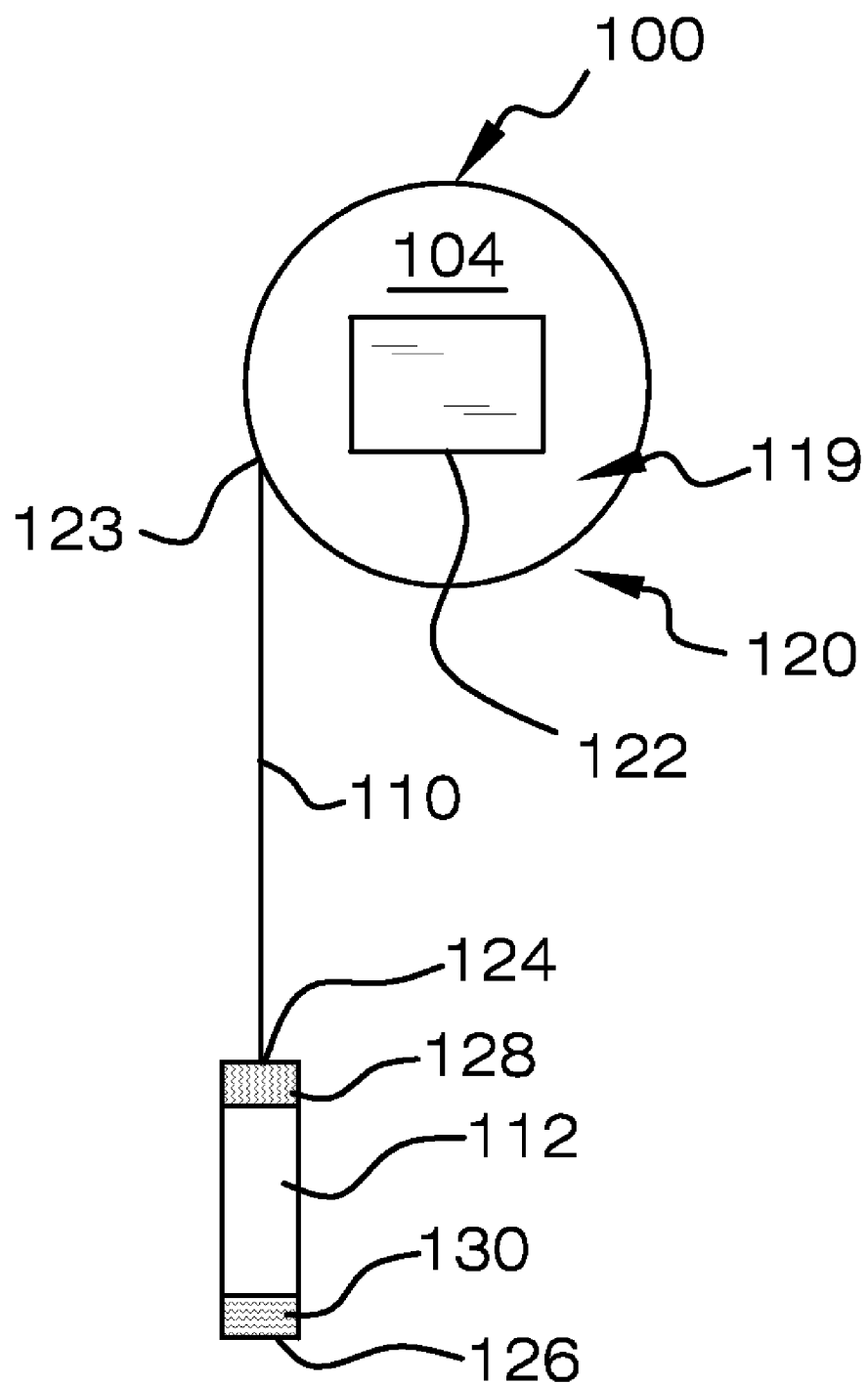
FIG. 3 is a rear view of tension relief device 100.

FIG. 2 is an exploded front view of tension relief device 100. FIG. 3 is a rear view of tension relief device 100. Tension relief device 100 may be a device to adjust tension in a shoulder belt 44 (FIG. 1) of safety belt 14. Tension relief device 100 may include a front cover 102, a back cover 104, a spring 106, a spring anchor 108, a cord 110, and a band 112.

Front cover 102 may have a front cover face 114 supporting a front cover side 116 and a release button 118. Front cover face 114 may be a round disc from which front cover side 116 may extend to form a front cover lip. Release button 118 may be configured to release tension on cord 110 on being pressed.

Back cover 104 may have a back cover face 119 supporting a back cover side 120 and tape 122. Back cover face 119 may be a round disc from which back cover side 120 may extend to form a back cover lip having a diameter that may be smaller than a diameter of front cover lip. Tape 122 may be a double sided hook-and-loop tape.

Spring 106 may be a spiral spring that may be positioned within an interior of back cover 104. Spring 106 show in FIG. 2 is a flat spiral spring. In one example, spring 106 may be a coiled internal power spring. Spring anchor 108 may secure spring 106 to the interior of back cover 104. Cord 110 may be attached between spring 106 and band 112 and extend from back cover 104 through a cover opening 123. Spring 106 may be configured to retract cord 110 to place cord 110 under tension. As noted above, this tension on cord 110 may be released by pressing release button 118. A combination of spring 106 and release button 118 may permit spring 106 to repeatedly wind and unwind cord 110.

Band 112 may be a measure of material having a first band end 124 and a second band end 126. First band end 124 may contain hook fasteners 128 and second band end 126 may contain loop fasteners 130. When brought together, hook fasteners 128 and loop fasteners 130 may be secured to each other to form a band loop 132 (FIG. 1) out of band 112. Cord 110 may be attached to first band end 124.

Figure 4:
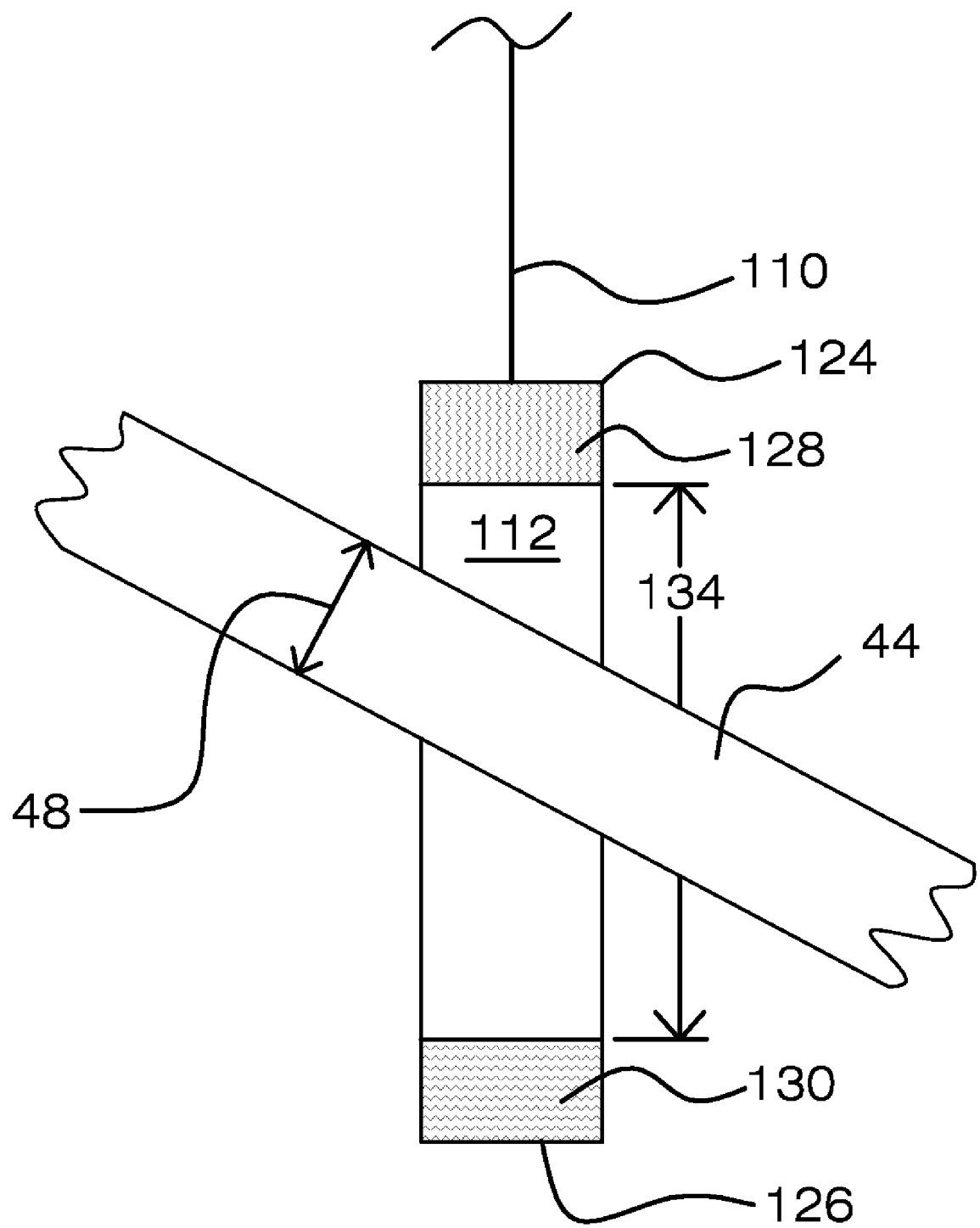
FIG. 4 is a detailed view of band 112 in a position to be placed about shoulder belt 44.

FIG. 4 is a detailed view of band 112 in a position to be placed about shoulder belt 44. Shoulder belt 44 may have a width 48. It may be important that band 112 be long enough to fit about shoulder belt 44 and be short enough to maintain a tight grip about shoulder belt 44. Accordingly, in one example, between hook fasteners 128 and loop fasteners 130 of band 112 may be an area having a band area height 134 that is not less than two times width 48 of shoulder belt 44 and not more than three times width 48. To secure band 112 about shoulder belt 44, hook fasteners 128 and loop fasteners 130 may be secure to each other to form a band loop 132 (FIG. 1) about shoulder belt 44.

As in FIG. 1, tension relief device 100 may be secured to horizontal frame 18 at a location forward of vertical frame 22. In one example, tension relief device 100 may be secured to an upper left side of an automobile interior, adjacent to a driver seat. Tape 122 (FIG. 3) may hold tension relief device 100 to horizontal frame 18. Band 112 may be secured about shoulder belt 44. As spring 106 pulls on cord 110, cord 110 may pull on shoulder belt 44 to draw shoulder belt 44 away from a person, thus adjusting tension in shoulder belt 44 and relieving pressing against the chest and shoulder of a person wearing safety belt 14.

The tension relief device may be a spring-loaded retraction mechanism that may be configured to restrict seat belt pressure on a driver. This device may prevent a shoulder strap from pressing against the chest and shoulder of a driver to minimize discomfort and chafing while traveling. The tension relief device may enable the seat belt to be worn in comfort while still affording full protection in the event of an accident.

This adjustable device may be mounted with hook-and-loop tape to the upper left side of the automobile interior, adjacent to the driver. An outer free end of the cord may contain a strap with hook-and-loop fasteners on opposite ends and sides, allowing for attachment to an existing safety belt.

If a driver was irritated by a snug shoulder seat belt, the tension relief device may be installed within an interior of a vehicle. Once applied with a double-sided tape, a retractable cord may be pulled out and the strap looped around the seat belt webbing. Upon securing the strap with hook-and-loop end fasteners and then releasing the strap, a spring-loaded retraction mechanism may pull upward on the cord. Tension from the tension relief device may pull the shoulder belt material slightly away from a driver's chest and shoulder area to minimize annoying contact. By positioning the tension relief device as noted, the tension relief device may keep the shoulder belt properly positioned for safety in the event of an accident while minimizing shoulder belt from retracting and pinching the body. In other words, slight slack provided by the tension relief device may maintain the effectiveness of a three-point safety belt harness in the event of a collision, thereby maintaining optimum safety for the rider.

The tension relief device may increase comfort for a user wearing a three-point safety belt. Appealing features of the tension relief device may be simplicity, comfort, safety, and ease of application. With this retractable cord mechanism reducing or eliminating belt tension on the chest and shoulder. Without dread of wearing a seat belt, motorists may be more willing to wear safety belts on a regular basis. This may help prevent an expensive citation from the police. Further, travelers may eliminate discomfort, chafing, and pinching due to an uncomfortable seat belt retracting against the body, as well as unsightly wrinkling or creasing of clothing. The tension relief device may be manufactured in different sizes and colors.

The information disclosed herein is provided merely to illustrate principles and should not be construed as limiting the scope of the subject matter of the terms of the claims. The written specification and figures are, accordingly, to be regarded in an illustrative rather than a restrictive sense. Moreover, the principles disclosed may be applied to achieve the advantages described herein and to achieve other advantages or to satisfy other objectives, as well.

What is claimed is:

1. A tension relief device to adjust tension in a shoulder belt of a vehicle, the tension relief device comprising:
   a front cover;
   a back cover placed within the front cover to form a cover opening;
   a spring anchor;
   a spring secured to an interior of the back cover by the spring anchor, where the spring is a flat spiral spring;
   a band having a first band end;
   a cord connected between the first band end and the spring, where the cord extends through the cover opening and moves in response to the spring; and
   means for removeably attaching the cord to the shoulder belt, where the means for removeably attaching the cord to the shoulder belt include a second band end as part of the band, where the first band end contains hook fasteners and the second band end contains loop fasteners such that, when brought together, the hook fasteners and loop fasteners are secured to each other to form a band loop.

2. The tension relief device of claim 1, where the front cover includes a front cover face supporting a front cover side and a release button, where the front cover face is a round disc, where the front cover side extends perpendicularly away from the round disc, and where the release button is configured to release tension on the cord on being pressed.

3. The tension relief device of claim 2, where the back cover includes a back cover face supporting a back cover side and tape, where the back cover face is a round disc, where the back cover side is attached about the round disc and extends perpendicularly away from the round disc, and where the tape is a double sided hook-and-loop tape.

4. The tension relief device of claim 3, where the cover opening is formed with the back cover placed within the front cover.

5. The tension relief device of claim 4, where the device is secured in the vehicle, where the vehicle includes a vertical frame positioned between a horizontal frame and a floor of the vehicle and having a webbing guide that is attached to the vertical frame, where the back cover is secured to the horizontal frame at a location that is above and forward of the webbing guide.

6. The tension relief device of claim 5, where the device is secured to an upper left side of the vehicle adjacent to a driver seat.

7. The tension relief device of claim 4, where the shoulder belt has a width and where between the hook fasteners and the loop fasteners of the band is an area having a height that is not less than two times the width of the shoulder belt and not more than three times the width of the shoulder belt.

8. In an automobile having a vertical frame positioned between a horizontal frame and a floor of the automobile and a webbing guide that is attached to the vertical frame, a tension relief device system to adjust tension in a shoulder belt, the tension relief device system comprising:
   a front cover;

a back cover placed within the front cover to form a cover opening, where the back cover is secured to the horizontal frame at a location that is above and forward of the webbing guide;

a spring anchor;

a spring secured to an interior of the back cover by the spring anchor, where the spring is a flat spiral spring;

a band for removeably attaching a cord to the shoulder belt, the band having a first end; and the cord connected between the first band end and the spring, where the cord extends through the cover opening and moves in response to the spring.

9. The tension relief device system of claim 8, where the front cover includes a front cover face supporting a front cover side and a release button, where the front cover face is a round disc, where the front cover side extends perpendicularly away from the round disc, and where the release button is configured to release tension on the cord on being pressed.

10. The tension relief device system of claim 9, where the back cover includes a back cover face supporting a back cover side and tape, where the back cover face is a round disc, where the back cover side is attached about the round disc and extends perpendicularly away from the round disc, and where the tape is a double sided hook-and-loop tape.

11. The tension relief device system of claim 10, where the cover opening is formed with the back cover placed within the front cover.

12. The tension relief device system of claim 11, where the band further includes a second band end, where the first band end contains hook fasteners and the second band end contains loop fasteners such that, when brought together, the hook fasteners and loop fasteners are secured to each other to form a band loop.

13. The tension relief device system of claim 12, where the shoulder belt has a width and where between the hook fasteners and the loop fasteners of the band is an area having a height that is not less than two times the width of the shoulder belt and not more than three times the width of the shoulder belt.

14. The tension relief device system of claim 13, where the device is secured to an upper left side of the vehicle adjacent to a driver seat.

15. The tension relief device system of claim 8, further comprising:

means for removeably attaching the cord to the shoulder belt.

16. The tension relief device system of claim 15, where the means for removeably attaching the cord to the shoulder belt include a second band end as part of the band, where the first band end contains hook fasteners and the second band end contains loop fasteners such that, when brought together, the hook fasteners and loop fasteners are secured to each other to form a band loop.

* * * * *